(12) United States Patent
Duchesne et al.

(10) Patent No.: US 12,007,936 B2
(45) Date of Patent: Jun. 11, 2024

(54) POWER EFFICIENT MEMORY VALUE UPDATES FOR ARM ARCHITECTURES

(71) Applicant: VMware LLC, Palo Alto, CA (US)

(72) Inventors: Regis Duchesne, Mont-de-Corsier (CH); Andrei Warkentin, South Elgin, IL (US); Cyprien Laplace, Boston, MA (US); Ye Li, Newton Highlands, MA (US); Alexander Fainkichen, Southborough, MA (US); Shruthi Hiriyuru, Boston, MA (US); Sunil Kotian, San Jose, CA (US)

(73) Assignee: VMware LLC, Palo Alto, CA (US)

( * ) Notice: Subject to any disclaimer, the term of this patent is extended or adjusted under 35 U.S.C. 154(b) by 0 days.

(21) Appl. No.: 17/580,866

(22) Filed: Jan. 21, 2022

(65) Prior Publication Data
US 2023/0237010 A1    Jul. 27, 2023

(51) Int. Cl.
*G06F 9/52* (2006.01)
*G06F 9/30* (2018.01)
*G06F 15/78* (2006.01)

(52) U.S. Cl.
CPC ...... *G06F 15/7842* (2013.01); *G06F 9/30087* (2013.01); *G06F 9/30123* (2013.01); *G06F 9/52* (2013.01)

(58) Field of Classification Search
CPC ......... G06F 9/30087; G06F 9/52; G06F 9/526
See application file for complete search history.

(56) References Cited

U.S. PATENT DOCUMENTS

| | | | |
|---|---|---|---|
| 10,409,744 B1* | 9/2019 | Gross | G06F 1/3287 |
| 11,416,749 B2* | 8/2022 | Bshara | G06F 9/542 |
| 2011/0161599 A1* | 6/2011 | Craske | G06F 12/0831 |
| | | | 711/E12.001 |
| 2012/0096239 A1* | 4/2012 | Solihin | G06F 9/30043 |
| | | | 712/205 |
| 2013/0061005 A1* | 3/2013 | Overby | G06F 1/3206 |
| | | | 711/E12.001 |
| 2018/0217655 A1* | 8/2018 | Higgs | G06F 1/3287 |

* cited by examiner

*Primary Examiner* — Jacob Petranek
(74) *Attorney, Agent, or Firm* — King Intellectual Asset Management

(57) ABSTRACT

Disclosed are various examples of providing provide efficient waiting for detection of memory value updates for Advanced RISC Machines (ARM) architectures. An ARM processor component instructs a memory agent to perform a processing action, and executes a waiting function. The waiting function ensures that the processing action is completed by the memory agent. The waiting function performs an exclusive load at a memory location, and a wait for event (WFE) instruction that causes the ARM processor component to wait in a low-power mode for an event register to be set. Once the event register is set, the waiting function completes and a second processing action is executed by the ARM processor component.

20 Claims, 4 Drawing Sheets

POWER EFFICIENT MEMORY VALUE UPDATES FOR ARM ARCHITECTURES

BACKGROUND

In computing various workloads, a pause functionality can include waiting in a tight loop repeatedly checking for a value in memory to change. Memory changes can include changing to become equal to a specific value, or to become different from a specific value. On some Complex Instruction Set Computer (CISC) systems including x86 systems, this kind of pause functionality can be implemented using an aptly named PAUSE instruction. On some Reduced Instruction Set Computer (RISC) systems including Advanced RISC Machine (ARM) architectures, a pause functionality can be implemented using a YIELD instruction. This hint instruction can operate in various ways depending on the microarchitecture and availability of hyperthreading or simultaneous multi-threading (SMT). For example, where hyperthreading is unavailable, the YIELD instructions may act as a no-operation (NOP) instruction.

This can provide some alleviation to what is otherwise a power-inefficient tight loop, but better facilities are required in order to factor out the basic primitive of waiting until a value in memory changes. However, the existing instructions in ARM systems can nevertheless be power intensive operations. As a result, more power-efficient instructions and functions are required.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

The present disclosure relates to providing efficient memory value update monitoring for Reduced Instruction Set Computer (RISC) systems, including Advanced RISC Machine (ARM) architectures. Some pause functionality can be used to wait in a tight loop for some value in memory to change. Memory changes can include changing to become equal to a specific value, or to become different from a specific value. On some Complex Instruction Set Computer (CISC) systems including x86 systems, a pause functionality can be implemented using a PAUSE instruction. On some Reduced Instruction Set Computer (RISC) systems including Advanced RISC Machine (ARM) architectures, a pause functionality can be implemented using a YIELD instruction. ARM-based pause instructions such as YIELD can operate in various ways depending on the microarchitecture and availability of hyperthreading or simultaneous multi-threading (SMT). For example, where hyperthreading is unavailable, the YIELD instructions may act as a no-operation (NOP) instruction. However, the existing instructions in ARM systems can nevertheless be power intensive operations. As a result, more power-efficient instructions and functions are required.

The present disclosure describes a power-efficient way to wait for and detect a memory update for RISC systems including ARM architectures. In some examples, a power efficient scheduling or waiting function such as a wait-until-likely function, a nondeterministic waiting function, or another waiting function are described. The described mechanisms can return as soon as possible when a predetermined condition is met, but can be described as nondeterministic or quasi-nondeterministic since the described mechanisms can occasionally return even though the condition is not met. In either case, the mechanisms can be more efficient than existing technologies, at least by using many fewer read operations and by allowing the processor to wait in a low power-consumption state.

Figure 1:
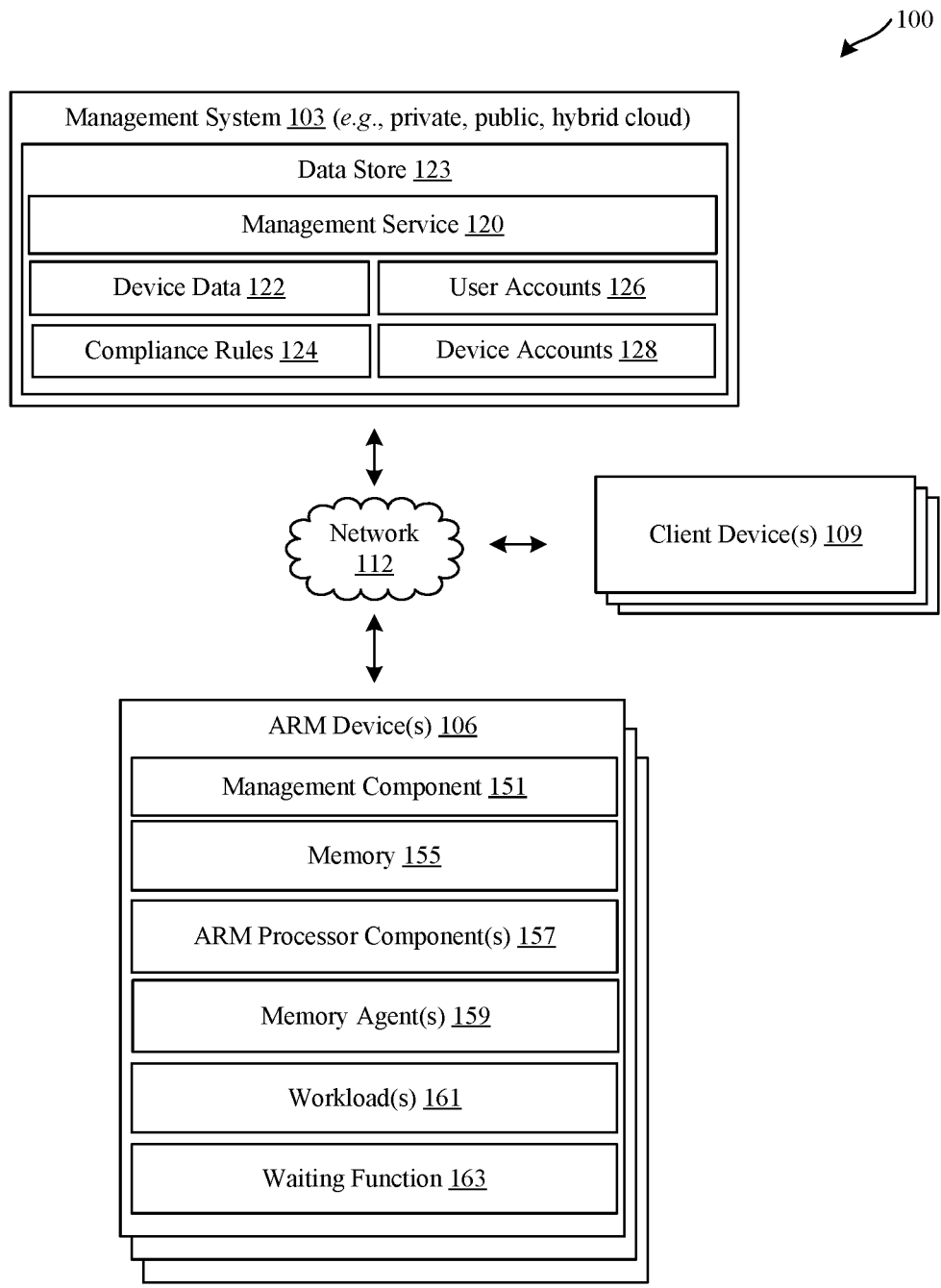
FIG. 1 is a drawing of an example of a computing environment that includes components that provide efficient waiting for detection of memory value updates for ARM architectures, according to the present disclosure.

With reference to FIG. 1, shown is an example of a computing environment 100. The computing environment 100 can include a management system 103, ARM devices 106, and other components in communication with one another over a network 112. In some cases, ARM devices 106 can include host computing devices or server computing devices of a private cloud, public cloud, hybrid cloud, and multi-cloud infrastructures. Hybrid cloud infrastructures can include public and private host computing devices. Multi-cloud infrastructures can include multiple different computing platforms from one or more service providers in order to perform a vast array of enterprise tasks.

The ARM devices 106 can also include devices that can connect to the network 112 directly or through an edge device or gateway. The components of the computing environment 100 can be utilized to provide virtualization solutions for an enterprise. The hardware of the ARM devices 106 can include physical memory, physical processors, physical data storage, and physical network resources that can be utilized by virtual machines. ARM devices 106 can also include peripheral components such as accelerator devices, smart network interface cards, or other cards that are installed as a peripheral component of an ARM, x86, or other host device, where each of the ARM device 106 and the host device can include one or more of physical memory, physical processors, physical data storage, and physical network resources.

Virtual memory, virtual processors, virtual data storage, and virtual network resources of a virtual machine can be mapped to physical memory, physical processors, physical data storage, and physical network resources. The virtual machines can be used to execute the workloads 161. The workloads 161 can be managed by the management service 120 for an enterprise that employs the management service 120. Some workloads 161 can be initiated and accessed by enterprise users through client devices.

The network 112 can include the Internet, intranets, extranets, wide area networks (WANs), local area networks (LANs), wired networks, wireless networks, other suitable networks, or any combination of two or more such networks. The networks can include satellite networks, cable networks, Ethernet networks, telephony networks, and other types of networks.

The management system 103 can include one or more host or server computers, and any other system providing computing capability. In some examples, a subset of the ARM devices 106 can provide the hardware for the management system 103. While referred to in the singular, the management system 103 can include a plurality of computing devices that are arranged in one or more server banks, computer banks, or other arrangements. The management system 103 can include a grid computing resource or any other distributed computing arrangement. The management system 103 can be multi-tenant, providing virtualization and management of workloads 161 for multiple different enterprises. Alternatively, the management system 103 can be customer or enterprise-specific.

The computing devices of the management system 103 can be located in a single installation or can be distributed among many different geographical locations which can be local and/or remote from the other components. The management system 103 can also include or be operated as one or more virtualized computer instances. For purposes of convenience, the management system 103 is referred to herein in the singular. Even though the management system 103 is referred to in the singular, it is understood that a plurality of management systems 103 can be employed in the various arrangements as described above.

The components executed on the management system 103 can include a management service 120, as well as other applications, services, processes, systems, engines, or functionality not discussed in detail herein. The management service 120 can be stored in the data store 123 of the management system 103. While referred to generally as the management service 120 herein, the various functionalities and operations discussed can be provided using a management service 120 that includes a scheduling service and a number of software components that operate in concert to provide compute, memory, network, and data storage for enterprise workloads and data. The management service 120 can also provide access to the enterprise workloads and data executed by the ARM devices 106 and can be accessed using client devices that can be enrolled in association with a user account 126 and related credentials.

The management service 120 can communicate with associated management instructions executed by ARM devices 106, client devices, edge devices, and IoT devices to ensure that these devices comply with their respective compliance rules 124, whether the specific ARM device 106 is used for computational or access purposes. If the ARM devices 106 or client devices fail to comply with the compliance rules 124, the respective management instructions can perform remedial actions including discontinuing access to and processing of workloads 161.

The data store 123 can include any storage device or medium that can contain, store, or maintain the instructions, logic, or applications described herein for use by or in connection with the instruction execution system. The data store 123 can be a hard drive or disk of a host, server computer, or any other system providing storage capability. While referred to in the singular, the data store 123 can include a plurality of storage devices that are arranged in one or more hosts, server banks, computer banks, or other arrangements. The data store 123 can include any one of many physical media, such as magnetic, optical, or semiconductor media. More specific examples include solid-state drives or flash drives. The data store 123 can include a data store of the management system 103, mass storage resources of the management system 103, or any other storage resources on which data can be stored by the management system 103. The data store 123 can also include memories such as RAM used by the management system 103. The RAM can include static RAM (SRAM), dynamic RAM (DRAM), synchronous DRAM (SDRAM), and other types of RAM.

The data stored in the data store 123 can include management data including device data 122, enterprise data, compliance rules 124, user accounts 126, and device accounts 128, as well as other data. Device data 122 can identify ARM devices 106 by one or more device identifiers, a unique device identifier (UDID), a media access control (MAC) address, an interne protocol (IP) address, or another identifier that uniquely identifies a device with respect to other devices.

The device data 122 can include an enrollment status indicating whether each client device 109 is enrolled with or managed by the management service 120. For example, an end-user device, an edge device, IoT device, or other client device 109 can be designated as "enrolled" and can be permitted to access the enterprise workloads and data hosted by ARM devices 106, while those designated as "not enrolled," or having no designation, can be denied access to the enterprise resources. The device data 122 can further include indications of the state of IoT devices, edge devices, end user devices, and other client devices. While a user account 126 can be associated with a particular person as well as client devices 109, a device account 128 can be unassociated with any particular person, and can nevertheless be utilized for an IoT device, edge device, or another client device 109 that provides automatic functionalities.

Device data 122 can also include data pertaining to user groups. An administrator can specify one or more of the ARM devices 106 as belonging to a user group. The user group can refer to a group of user accounts 126, which can include device accounts 128. User groups can be created by an administrator of the management service 120.

Compliance rules 124 can include, for example, configurable criteria that must be satisfied for the ARM devices 106 to be in compliance with the management service 120. The compliance rules 124 can be based on a number of factors, including geographical location, activation status, enrollment status, and authentication data, including authentication data obtained by a device registration system, time, and date, and network properties, among other factors associated with each device. The compliance rules 124 can also be determined based on a user account 126 associated with a user.

Compliance rules 124 can include predefined constraints that must be met in order for the management service 120, or other applications, to permit ARM devices 106 access to enterprise data and other functions of the management service 120. The management service 120 can communicate with management instructions on the client device 109 to determine whether states exist on the client device 109 which do not satisfy one or more of the compliance rules 124. States can include, for example, a virus or malware being detected; installation or execution of a blacklisted application; and/or a device being "rooted" or "jailbroken," where root access is provided to a user of the device. Additional states can include the presence of particular files, questionable device configurations, vulnerable versions of applications, vulnerable states of the client devices 109 or other vulnerability, as can be appreciated. While the client devices 109 are generally discussed as devices that access workloads 161 that are executed by the ARM devices 106, all types of client devices 109 discussed can also execute virtualization components and provide hardware used to host workloads 161. In other words, a client device 109 can be utilized as a host device for an ARM device 106.

The management service 120 can oversee the management and resource scheduling using hardware provided using ARM devices 106. The management service 120 can transmit various software components, including enterprise workloads, enterprise data, and other enterprise resources for processing and storage using the various ARM devices 106. The ARM devices 106 can include host devices such as a server computer or any other system providing computing capability, including those that compose the management system 103. ARM devices 106 can include public, private, hybrid cloud and multi-cloud devices that are operated by third parties with respect to the management service 120. The ARM devices 106 can be located in a single installation or can be distributed among many different geographical locations which can be local and/or remote from the other components.

The ARM devices 106 can include accelerator devices that are connected to a host device, client device, or edge device through a universal serial bus (USB) connection, a Peripheral Component Interconnect Express (PCI-e) or mini-PCI-e connection, or another physical connection. Accelerator devices can include a hardware accelerator specialized to perform artificial neural networks, machine vision, machine learning, and other types of special purpose instructions written using CUDA, OpenCL, C++, and other instructions. The accelerator devices can utilize in-memory processing, low-precision arithmetic, and other types of techniques.

The management service 120 can include a scheduling service that monitors resource usage of the ARM devices 106, and particularly the ARM devices 106 that execute enterprise workloads. This can include resource usage of accelerator devices that are installed on the ARM devices 106. While the management service 120 can schedule enterprise workloads on any ARM device 106 or client device 109 that includes virtualization components such as the management component 151.

The ARM device 106 can include a management component 151. The management component 151 can communicate with the management service 120 for scheduling of workloads 161 executed using virtual resources that are mapped to the physical resources of one or more ARM device 106. The physical resources of the ARM device 106 can include a memory 155, an ARM processor component 157, and other components. In this context, a memory 155 can refer to volatile and nonvolatile memory and data storage components. A memory 155 can also represent a combination of one or more of various types of storage devices, such as RAM, mass storage devices, flash memory, or hard disk storage. A memory 155 can include a memory device of the ARM device 106 or a memory that the ARM device 106 accesses for read, write, and other actions.

An ARM processor component 157 can include a physical ARM central processing unit (CPU) device or a logical processing unit of an ARM CPU. A single ARM CPU can include multiple processors, each processor can include multiple cores, and each core can include multiple threads. A single ARM CPU can include multiple logical processing units. A logical processing unit can correspond to one or more processor, one or more core, one or more thread, and so on. Each logical processing unit can be capable of executing its own stream or set of instructions simultaneously with other logical processing units.

The ARM device 106 can include one or more memory agents 159. A memory agent 159 can include any device that can write to the memory 155. A memory agent 159 can in some examples observe, read, and write to the memory 155. A memory agent 159 can include any of the ARM processor components 157 or another device. In some examples, a memory agent 159 can include an x86 processor component. An x86 processor component can include a physical CPU device or a logical processing unit of an x86 CPU. The x86 processor component can be installed as a peripheral device of the ARM device 106, or the ARM device 106 can be installed as a peripheral device of an x86 host such as an x86-based client device 109. A memory agent 159 can also include processor components and other components of devices with an architecture other than ARM or x86.

The ARM device 106 can include a waiting function 163. The waiting function 163 can be considered a scheduling function, and can be used to ensure a proper order of operations for various actions performed by the ARM processor components 157 and other memory agents 159 with the ability to write to the memory 155. The waiting function 163 can include a wait-until-likely function or nondeterministic waiting function, since the waiting function 163 can trigger a check of the memory 155 even though a specified condition is not met. In other words, the waiting function 163 can wait until it receives an indication that the specified condition is likely to be met, and can subsequently verify whether the condition is met prior to providing an indication that the condition is actually met. An event register becoming set can provide an unverified indication that an action is completed that can be indicative that the specified condition is likely to be met. However, the waiting function 163 can also read the memory 155 and compare it to a predetermined value in order to verify that the action is completed and the condition is met. This is described in further detail with respect to FIG. 2.

Figure 2:
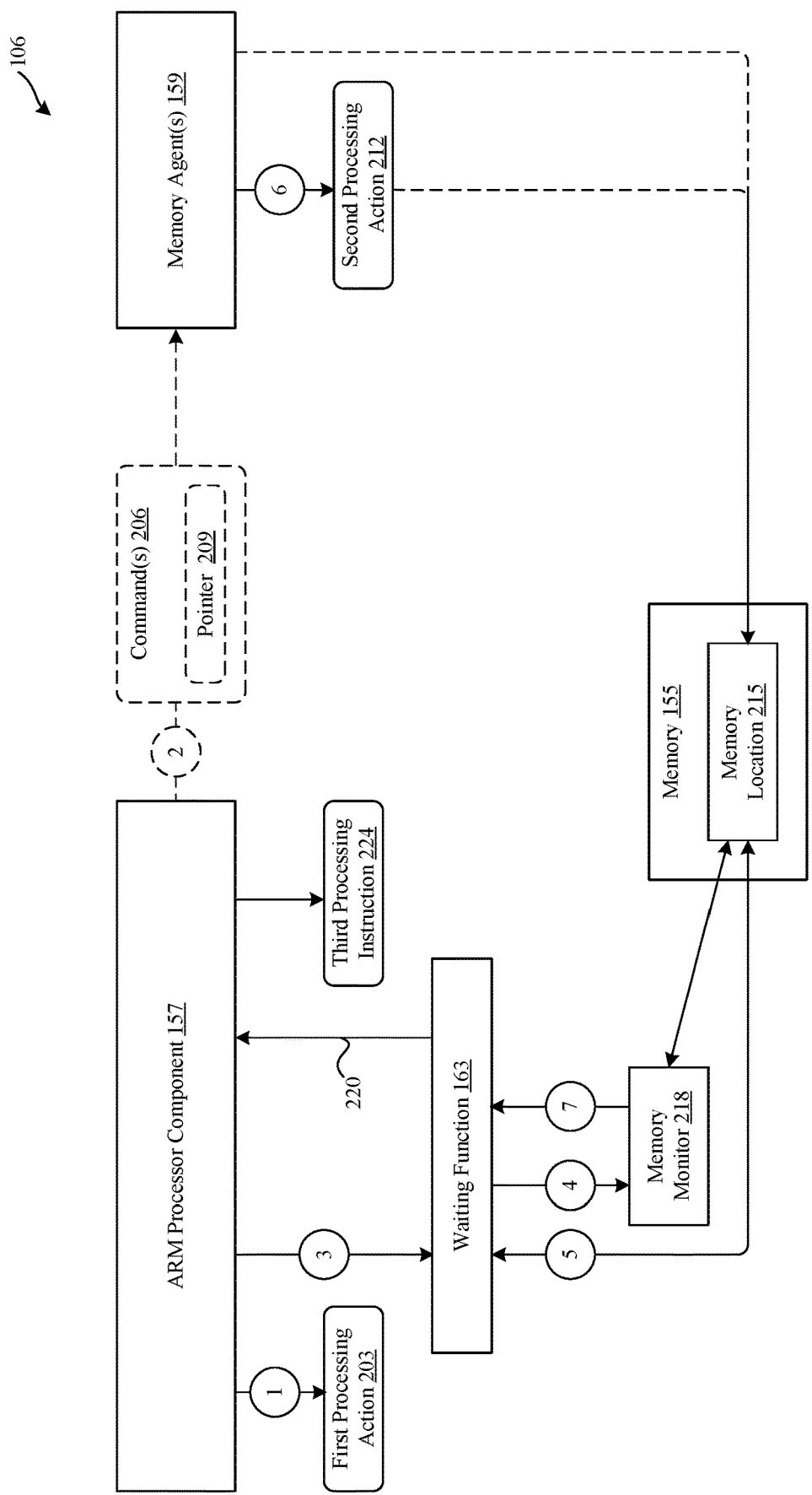
FIG. 2 is a drawing that provides an example of the operation of components of the computing environment of FIG. 1, according to the present disclosure.

FIG. 2 is a drawing that provides an example of the operation of components of the ARM device 106 to provide a power-efficient way to wait for a value in memory to update for ARM architectures. The drawing shows an example of the ARM processor component 157 using the waiting function 163 to identify a memory value update in a power efficient manner. While the steps are discussed as performed by a particular component, other components can also work in concert to complete the steps. While the steps are discussed in a particular order, the steps can be reordered and the steps can be omitted in various embodiments and scenarios.

In step 1, the ARM processor component 157 can perform a first processing action 203. The first processing action 203 can include a portion of a workload 161 executed using the ARM device 106. The workload 161 can include an enterprise or management workload 161 assigned to execute using the ARM device 106 by the management service 120, or any other workload 161. The first processing action 203 can include execution of program instructions that can include computations, reads, writes, and other instructions.

The workload 161 can include multiple actions that are performed by the ARM processor component 157 and other memory agents 159. The waiting function 163 can be used in order to ensure that the actions of the workload 161 are executed without interference, or in a particular order. The waiting function 163 can be used for workloads 161 that include or use mutate, lock, and an ad-hoc synchronization. A mutate operation can include an operation that alters a value of a particular variable. A lock can prevent modification of a value in a memory location until the lock is released. Ad-hoc synchronization can include maintaining a specified order of various actions of a workload 161 that are performed by the ARM processor component 157 and other memory agents 159, regardless of whether each action affects or alters any particular location in the memory 155.

In step 2, the ARM processor component 157 can transmit one or more commands 206 to perform a second processing action 212 of the workload 161. The second processing action 212 can include execution of program instructions that can include computations, reads, writes, and other instructions. The commands 206 can include a pointer 209 to a memory location 215, as well as instructions that specify the second processing action 212. The ARM processor component 157 and the memory agent 159 can alternatively receive commands to perform instructions or the various actions from another component of the ARM device 106, or a host device to which the ARM device 106 is installed as a peripheral.

The pointer 209 can be transmitted along with pointer data that includes the length of the memory location 215. The memory location 215 can be referred to as a pointer memory location, since the pointer 209 points to the memory location 215. The command 206 can also include a predetermined value to write to the memory location 215. All of this data can be shared knowledge between the ARM processor component 157 and the memory agent 159, whether or not the ARM processor component 157 transmits the command 206.

In step 3, the ARM processor component 157 can execute or invoke the waiting function 163. The waiting function 163 can wait for the memory agent 159 to perform the second processing action 212. This can ensure that the memory agent 159 performs the second processing action 212 or a particular portion of the second processing action 212 before the ARM processor component 157 performs the third processing action 224. The third processing action 224 can include execution of program instructions that can include computations, reads, writes, and other instructions.

The waiting function 163 can be executed or invoked using parameters that specify the pointer 209 to the memory location 215, as well as the condition to evaluate, and a predetermined value. One or more parameter that specifies the length of the memory location 215 or modifies the waiting function 163 for the length of the memory location 215 can also be provided. Generally, the waiting function 163 can cause the "waiting" ARM processor component 157 to perform a load-exclusive instruction at the memory location 215 specified by the pointer 209, and then to execute a WFE instruction that waits in a power-efficient manner until a "signaling" memory agent 159 modifies that memory location 215. While the following discussion refers to the waiting function 163 performing instructions, the process involves the ARM processor component 157 executing the waiting function 163 to perform the instructions.

If the waiting function 163 involves evaluation of an "equal to" (==) condition, then the predetermined value can be any arbitrary and specific value to write to the memory location 215. Evaluation of the "equal to" condition can include a comparison that confirms whether the memory value of the memory location 215 is the same as the predetermined value, prior to allowing the ARM processor component 157 to continue. The condition that is evaluated by the waiting function 163 can alternatively involve a "not equal to" or "different from" (!=) condition where the value of the memory location 215 is confirmed to be different from a particular value. For example, the first processing action 203 can include writing a particular value to the memory location 215. The waiting function 163 can then confirm whether the memory value of the memory location 215 is different from the particular value, prior to allowing the ARM processor component 157 to continue to the next action.

In step 4, the waiting function 163 can execute according to the specified parameters. The waiting function 163 can include an instruction that sets the memory monitor 218, and another instruction that clears the memory monitor 218. For example, the wait for event (WFE) instruction can clear the memory monitor 218 when performed while the memory monitor 218 is set. The memory monitor 218 can include an event register such as a flag, a bit, or another value in a thread, core, or processor register.

A next instruction of the waiting function 163 can include a data synchronization barrier (DSB) instruction or another instruction that ensures the first two instructions are performed prior to other instructions. In some examples the DSB or data memory barrier (DMB) instructions can specify an option that causes an operation that waits only for loads to complete and only out to a point of unification (e.g., NSHLD). This option can be provided for the purpose of ordering the execution of these instructions using the "waiting" ARM processor component 157 that uses the waiting function 163.

In step 5, the waiting function 163 can perform a load-exclusive instruction (e.g., ldxr). The load-exclusive instruction can load or read the memory location 215. Executing the load-exclusive instruction with the memory location 215 as a parameter can cause the memory monitor 218 to be set by any write or store operation at the memory location 215. However, the memory monitor 218 can be set in response to an event such as an interrupt request (IRQ), fast interrupt request (FIQ), an imprecise data abort event, a debug entry request, and an event signaled by another ARM processor component 157 using an instruction that sets the memory monitor 218. As a result, a false positive can be triggered. The mechanism nevertheless improves power efficiency and does not cause faults since a verification process can verify that the memory location 215 corresponds to an expected or specified condition (e.g., equal to or different from a specified value).

The waiting function 163 can perform an instruction that compares the memory value read from the memory location 215 to the predetermined value. The waiting function 163 can then evaluate a specified condition based on the comparison. If the condition is satisfied, then the waiting function 163 can jump to an instruction or set of instructions that ends the waiting function 163, which can act as a notification 221 for the ARM processor component 157 to proceed with instructions of the third processing action 224. However, if the condition is not satisfied, then the waiting function 163 can execute a 'wait for event' instruction (e.g., WFE) that waits in a low-power mode for the event register or memory monitor 218 to become set.

In step 6, the memory agent 159 can perform the second processing action 212 of the workload 161. The second processing action 212 can include instructions that update the memory value at the memory location 215 to the predetermined value, or otherwise modifies the memory value at the memory location 215 specified by the pointer 209.

In step 7, this modification of the memory value at the memory location 215 can set the memory monitor 218, which triggers the waiting function 163 to continue the operation to the next line after the wait for event instruction. This line can start the instruction or set of instructions that ends the waiting function 163, which can act as a notification 221 for the ARM processor component 157 to proceed with instructions of the third processing action 224.

Figure 3:
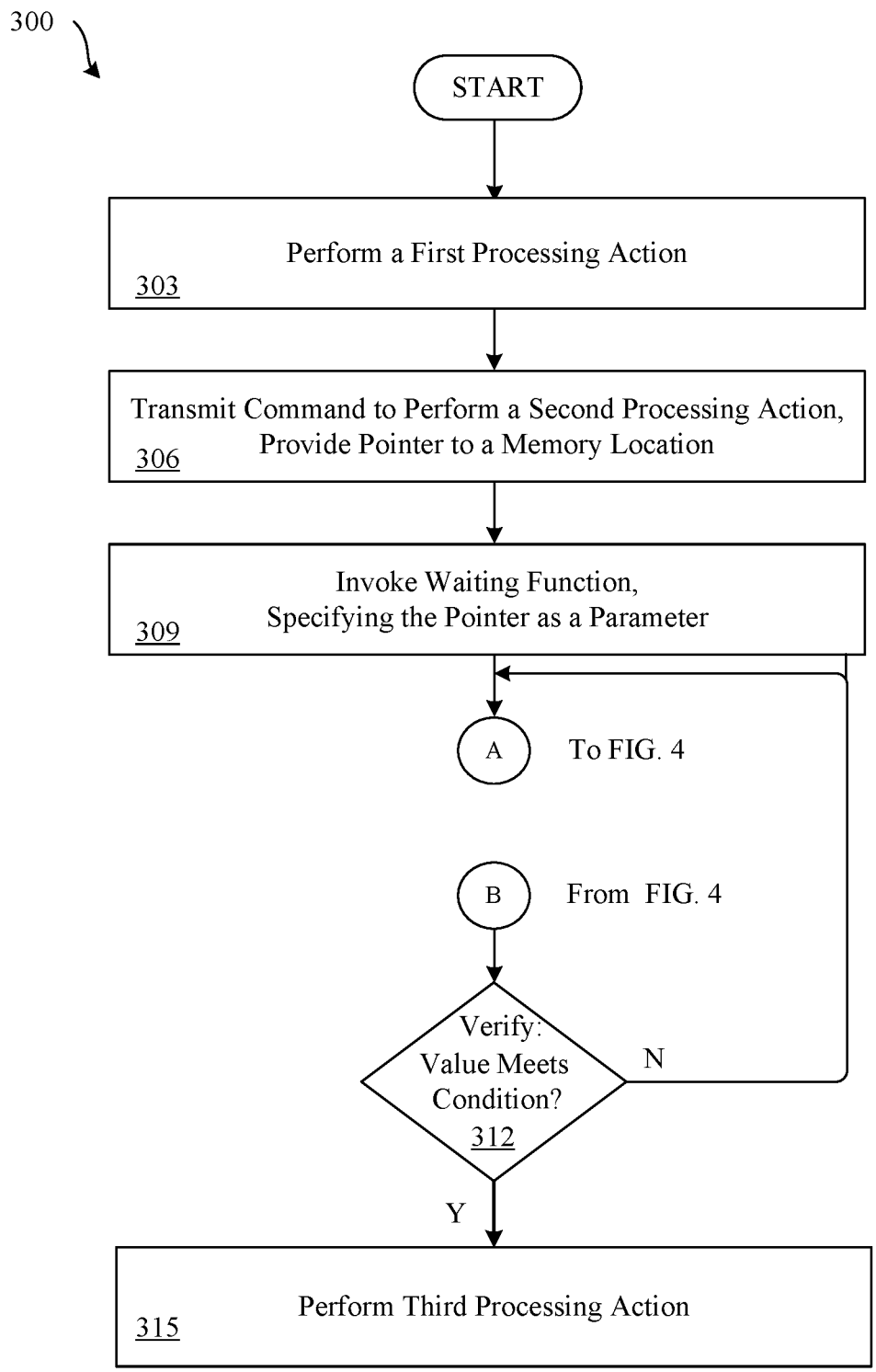
FIG. 3 is a flowchart illustrating functionality implemented by components of the computing environment, according to the present disclosure.

FIG. 3 shows a flowchart 300 that provides an example of the operation of components of the computing environment 100 to provide a power-efficient way to wait for a value in memory to update for ARM architectures. Generally, this describes how an ARM processor component 157 executes instructions that perform a first processing action 203, invoke a waiting function 163, and perform a third processing action 224. The waiting function 163 can be a power efficient function that waits for a second processing action 212 to be performed by a memory agent 159.

In step 303, the ARM processor component 157 can perform a first processing action 203. The first processing action 203 can include a portion of a workload 161 executed using the ARM device 106. The workload 161 can include an enterprise or management workload 161 assigned to execute using the ARM device 106 by the management service 120, or any other workload 161. The workload 161 can include the first processing action 203, the second processing action 212, and the third processing action 224. Each of the first processing action 203, second processing action 212, and third processing action 224 can include execution of program instructions that can include computations, reads, writes, and other instructions. The first processing action 203, the second processing action 212, and the third processing action 224 can be ordered according to an order of operations of the workload 161 that enforces the third processing action 224 to be performed only subsequent to completion of the second processing action 212. The order of operations of the workload 161 can also enforce the second processing action 212 to be performed only subsequent to completion of the first processing action 203.

The workload 161 can include multiple actions that are performed by the ARM processor component 157 and other memory agents 159. The waiting function 163 can be used in order to ensure that the actions of the workload 161 are executed without interference, or in a particular order. The waiting function 163 can be used for workloads 161 that include or use mutate, lock, and an ad-hoc synchronization. A mutate operation can include an operation that alters a value of a particular variable. A lock can prevent modification of a value in a memory location until the lock is released. Ad-hoc synchronization can include maintaining a specified order of various actions of a workload 161 that are performed by the ARM processor component 157 and other memory agents 159, regardless of whether each action affects or alters any particular location in the memory 155.

In step 306, the ARM processor component 157 can transmit one or more commands 206 to perform a second processing action 212 of the workload 161. The second processing action 212 can include execution of program instructions that can include computations, reads, writes, and other instructions. The commands 206 can also provide a pointer 209 to a memory location 215, as well as instructions that specify the second processing action 212.

The pointer 209 can be transmitted along with pointer data that includes the length of the memory location 215. The memory location 215 can be referred to as a pointer memory location, since the pointer 209 points to the memory location 215. The command 206 can also include a predetermined value to write to the memory location 215. All of this data can be shared knowledge between the ARM processor component 157 and the memory agent 159, whether or not the ARM processor component 157 transmits the command 206.

Figure 4:
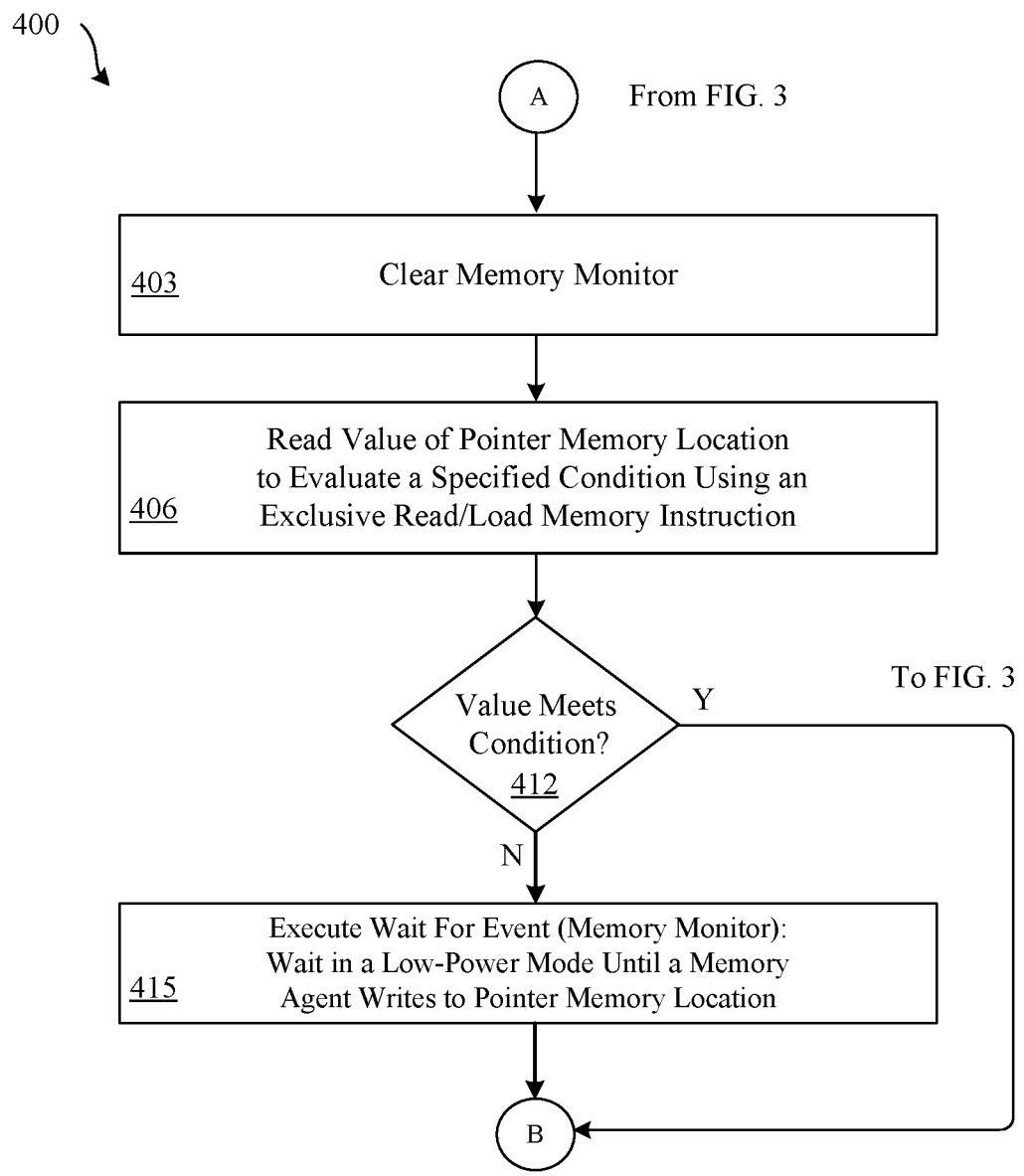
FIG. 4 is a flowchart illustrating functionality implemented by components of the computing environment, according to the present disclosure.

In step 309, the ARM processor component 157 can execute or invoke the waiting function 163. The instructions executed by the ARM processor component 157 to invoke the waiting function 163 can specify a set of parameters that include the pointer 209 that points to the memory location 215. The set of parameters can also specify the length of the memory location 215. The process can then move to connector A, which connects to FIG. 4. FIG. 4 describes the waiting function 163.

Generally, the waiting function 163 can wait for the memory agent 159 to perform the second processing action 212. This can ensure that the memory agent 159 performs the second processing action 212 or a particular portion of the second processing action 212 before the ARM processor component 157 performs the third processing action 224. The waiting function 163 can use a power efficient WFE instruction to wait for a memory agent 159 to signal its completion of the second processing action 212 by modification of a memory value of the memory location 215 specified by the pointer 209. Once the waiting function 163 is completed, the process can move to connector B.

In step 312, the ARM processor component 157 can evaluate a specified condition based on the value at the memory location 215. This can include comparing the value at the memory location 215 to a predetermined value. This can be performed as a verification that an expected action has completed. If the specified condition is met, the process can move to step 315. Otherwise, the process can move back to step 309 or connector A.

In step 315, the ARM processor component 157 can perform the third processing action 224. The third processing action 224 can be an action of the workload 161 that depends on or can interfere with the second processing action 212. The third processing action 224 can include the execution of program instructions that can include computations, reads, writes, and other instructions.

FIG. 4 shows a flowchart 400 that provides an example of the operation of components of the computing environment 100 to provide a power-efficient way to wait for a value in memory to update for ARM architectures. Generally, this describes functionalities provided by the waiting function 163. The waiting function 163 can be a power efficient function executed by the ARM processor component 157.

In step 403, the waiting function 163 can clear a memory monitor 218. The waiting function 163 can include a set of instructions that clear the memory monitor 218 by performing a memory monitor set instruction, and then performing a wait for event instruction. These instructions can clear the memory monitor 218 when performed in order. The memory monitor 218 can include an event register such as a flag, a bit, or another value in a thread, core, or processor register. A next instruction of the waiting function 163 can include a data synchronization barrier (DSB) instruction that ensures the first two instructions are performed prior to other instructions.

In step 406, the waiting function 163 can perform a load-exclusive instruction (e.g., ldxr). The load-exclusive instruction can load or read the memory location 215. Executing the load-exclusive instruction with the memory location 215 as a parameter can cause the memory monitor 218 to be set by a write or store to the pointer memory location 215. The instruction can read a value at the memory location 215 specified by the pointer 209. The waiting function 163 can evaluate a specified condition based on the value at the memory location 215. This can include comparing the value at the memory location 215 to a predetermined value.

In step 412, if the condition is satisfied, then the waiting function 163 can jump to an instruction or set of instructions that ends the waiting function 163, which can act as a notification 221 for the ARM processor component 157 to proceed with instructions of the third processing action 224. The process can move to connector B, and back to FIG. 3. If the condition is not satisfied, then the waiting function 163 can move to step 415.

In step 415, the waiting function 163 can execute a 'wait for event' instruction (e.g., WFE). The 'wait for event' instruction can wait in a low-power mode for the memory monitor 218 to become set. The memory monitor 218 can be set by a write or store to the memory location 215.

The memory agent 159 can perform the second processing action 212 of the workload 161. The second processing action 212 can include instructions that update the memory value at the memory location 215 to the predetermined value or otherwise mutate the memory value. The memory agent 159 can alternatively modify the memory value at the memory location 215 specified by the pointer 209 after the second processing action 212 is completed. This modification of the memory value at the memory location 215 can set the memory monitor 218. The WFE instruction of the waiting function 163 can identify or receive notification that the memory monitor 218 is set, and the process can move to connector B, which connects to FIG. 3.

A number of software components are stored in the memory and executable by a processor. In this respect, the term "executable" means a program file that is in a form that can ultimately be run by the processor. Examples of executable programs can be, for example, a compiled program that can be translated into machine code in a format that can be loaded into a random access portion of one or more of the memory devices and run by the processor, code that can be expressed in a format such as object code that is capable of being loaded into a random access portion of the one or more memory devices and executed by the processor, or code that can be interpreted by another executable program to generate instructions in a random access portion of the memory devices to be executed by the processor. An executable program can be stored in any portion or component of the memory devices including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

Memory devices can include both volatile and nonvolatile memory and data storage components. Also, a processor can represent multiple processors and/or multiple processor cores, and the one or more memory devices can represent multiple memories that operate in parallel processing circuits, respectively. Memory devices can also represent a combination of various types of storage devices, such as RAM, mass storage devices, flash memory, or hard disk storage. In such a case, a local interface can be an appropriate network that facilitates communication between any two of the multiple processors or between any processor and any of the memory devices. The local interface can include additional systems designed to coordinate this communication, including, for example, performing load balancing. The processor can be of electrical or of some other available construction.

Although the various services and functions described herein can be embodied in software or code executed by general purpose hardware as discussed above, as an alternative, the same can also be embodied in dedicated hardware or a combination of software/general purpose hardware and dedicated hardware. If embodied in dedicated hardware, each can be implemented as a circuit or state machine that employs any one of or a combination of a number of technologies. These technologies can include discrete logic circuits having logic gates for implementing various logic functions upon an application of one or more data signals, application specific integrated circuits (ASICs) having appropriate logic gates, field-programmable gate arrays (FPGAs), or other components.

The sequence diagrams and flowcharts can show examples of the functionality and operation of an implementation of portions of components described herein. If embodied in software, each block can represent a module, segment, or portion of code that can include program instructions to implement the specified logical function(s). The program instructions can be embodied in the form of source code that can include human-readable statements written in a programming language or machine code that can include numerical instructions recognizable by a suitable execution system such as a processor in a computer system or other system. The machine code can be converted from the source code. If embodied in hardware, each block can represent a circuit or a number of interconnected circuits to implement the specified logical function(s).

Although sequence diagrams and flowcharts can be shown in a specific order of execution, it is understood that the order of execution can differ from that which is depicted. For example, the order of execution of two or more blocks can be scrambled relative to the order shown. Also, two or more blocks shown in succession can be executed concurrently or with partial concurrence. Further, in some embodiments, one or more of the blocks shown in the drawings can be skipped or omitted.

Also, any logic or application described herein that includes software or code can be embodied in any non-transitory computer-readable medium for use by or in connection with an instruction execution system such as a processor in a computer system or other system. In this sense, the logic can include, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can include any one of many physical media, such as magnetic, optical, or semiconductor media. More specific examples of a suitable computer-readable medium include solid-state drives or flash memory. Further, any logic or application described herein can be implemented and structured in a variety of ways. For example, one or more applications can be implemented as modules or components of a single application. Further, one or more applications described herein can be executed in shared or separate computing devices or a combination thereof. For example, a plurality of the applications described herein can execute in the same computing device, or in multiple computing devices.

It is emphasized that the above-described embodiments of the present disclosure are merely possible examples of implementations described for a clear understanding of the principles of the disclosure. Many variations and modifications can be made to the above-described embodiments without departing substantially from the spirit and principles of the disclosure. All such modifications and variations are intended to be included in the following claims herein, within the scope of this disclosure.

Therefore, the following is claimed:

1. A non-transitory computer-readable medium comprising executable instructions, wherein the instructions, when executed by at least one processor, cause the at least one processor to at least:
   execute, by an Advanced RISC Machines (ARM) processor component, a first processing action;
   transmit, by the ARM processor component, at least one command to a memory agent, the at least one command comprising instructions to perform a second processing action;
   execute, by the ARM processor component, a waiting function to ensure that the second processing action is completed by the memory agent prior to a third processing action, the waiting function comprising: an exclusive load implemented using an LDXR instruction at a memory location, and a wait for event implemented using a WFE instruction that causes the ARM processor component to wait in a low-power mode for an event register to be set, followed by a data barrier implemented using a DMB instruction or a DSB instruction, wherein an NSHLD option specified as instructions for the data barrier causes execution of the data barrier to provide an ordering operation that waits only for loads to complete and only out to a point of unification, thereby ensuring that the LDXR instruction and the WFE instruction are executed prior to other instructions of the waiting function, and wherein the waiting function completes the other instructions based at least in part on the event register becoming set, wherein the other instructions confirm that the event register is set by the second processing action rather than a false positive event; and
   execute, by the ARM processor component, the third processing action based at least in part on completion of the waiting function.

2. The non-transitory computer-readable medium of claim 1, wherein the first processing action, the second processing action, and the third processing action are an ordered set of actions of a workload.

3. The non-transitory computer-readable medium of claim 1, wherein the ARM processor component comprises a central processing unit, a core, or a thread.

4. The non-transitory computer-readable medium of claim 1, wherein the memory agent comprises one of: the ARM processor component, an x86 processor component, or a device comprising a memory writing capability.

5. The non-transitory computer-readable medium of claim 4, wherein the event register becoming set provides an unverified indication that the second processing action is completed by the memory agent.

6. The non-transitory computer-readable medium of claim 1, wherein the at least one command specifies a pointer to the memory location.

7. The non-transitory computer-readable medium of claim 1, wherein the waiting function evaluates a condition that compares a value at the memory location to a predetermined value to verify that the second processing action is completed.

8. A system, comprising:
   at least one computing device comprising at least one processor; and
   a data store comprising executable instructions, wherein the instructions, when executed by the at least one processor, cause the at least one computing device to at least:
   transmit, by an Advanced RISC Machines (ARM) processor component, at least one command to a memory agent, the at least one command comprising instructions to perform a first processing action;
   execute, by the ARM processor component, a waiting function to ensure that the first processing action is completed by the memory agent prior to a second processing action, the waiting function comprising: an exclusive load implemented using an LDXR instruction at a memory location, and a wait for event implemented using a WFE instruction that causes the ARM processor component to wait in a low-power mode for an event register to be set, followed by a data barrier implemented using a DMB instruction or a DSB instruction, wherein an option specified as instructions for the data barrier causes execution of the data barrier to provide an ordering operation that waits only for loads to complete and only out to a point of unification, thereby ensuring that the LDXR instruction and the WFE instruction are executed prior to other instructions of the waiting function, and wherein the waiting function completes the other instructions based at least in part on the event register becoming set, wherein the other instructions confirm that the event register is set by the first processing action rather than a false positive event; and
   execute, by the ARM processor component, a second processing action based at least in part on completion of the waiting function.

9. The system of claim 8, wherein the first processing action and the second processing action are an ordered set of actions of a workload.

10. The system of claim 8, wherein the ARM processor component comprises a central processing unit, a core, or a thread.

11. The system of claim 8, wherein the memory agent comprises one of: the ARM processor component, an x86 processor component, or a device comprising a memory writing capability.

12. The system of claim 11, wherein the event register becoming set provides an unverified indication that the first processing action is completed by the memory agent.

13. The system of claim 8, wherein the at least one command specifies a pointer to the memory location.

14. The system of claim 8, wherein the waiting function evaluates a condition that compares a value at the memory location to a predetermined value to verify that the first processing action is completed.

15. A method, comprising:
   transmitting, by an Advanced RISC Machines (ARM) processor component, at least one command to a memory agent, the at least one command comprising instructions to perform a first processing action;
   executing, by the ARM processor component, a waiting function to ensure that the first processing action is completed by the memory agent prior to a second processing action, the waiting function comprising: an exclusive load implemented using an LDXR instruction at a memory location, and a wait for event implemented using a WFE instruction that causes the ARM processor component to wait in a low-power mode for an event register to be set, followed by a data barrier implemented using a DMB instruction or a DSB instruction, wherein an option specified as instructions for the data barrier causes execution of the data barrier to provide an ordering operation that waits only for loads to complete and only out to a point of unification, thereby ensuring that the LDXR instruction and the WFE instruction are executed prior to other instructions of the waiting function, and wherein the waiting function completes the other instructions based at least in part on the event register becoming set wherein the other instructions confirm that the event register is set by the first processing action rather than a false positive event; and executing, by the ARM processor component, a second processing action based at least in part on completion of the waiting function.

16. The method of claim 15, wherein the first processing action and the second processing action are an ordered set of actions of a workload, and the waiting function ensures that the second processing action is performed after the first processing action.

17. The method of claim 15, wherein the ARM processor component comprises a central processing unit, a core, or a thread.

18. The method of claim 15, wherein the memory agent comprises one of: the ARM processor component, an x86 processor component, or a device comprising a memory writing capability.

19. The method of claim 18, wherein the event register becoming set provides an unverified indication that the first processing action is completed by the memory agent.

20. The method of claim 15, wherein the at least one command specifies a pointer to the memory location.

* * * * *